United States Patent [19]

Watanabe et al.

[11] Patent Number: 5,101,399
[45] Date of Patent: Mar. 31, 1992

[54] DECK BASE LOCKING DEVICE FOR RECORDING PLAYBACK UNIT

[75] Inventors: Hidetaka Watanabe; Kanji Fukunaga, both of Hyogo, Japan

[73] Assignee: Mitsubishi Denki Kabushiki Kaisha, Tokyo, Japan

[21] Appl. No.: 253,278

[22] Filed: Oct. 4, 1988

[30] Foreign Application Priority Data

Nov. 5, 1987 [JP] Japan .................. 62-168481[U]

[51] Int. Cl.⁵ .............................................. G11B 23/00
[52] U.S. Cl. .................................. 369/263; 369/264; 369/269
[58] Field of Search ................ 369/75.1, 258, 261, 369/263, 79, 264, 269

[56] References Cited

U.S. PATENT DOCUMENTS

| | | | |
|---|---|---|---|
| 2,157,158 | 5/1939 | Blessing et al. | 369/263 |
| 3,059,882 | 10/1962 | Staar | 369/263 X |
| 4,279,423 | 7/1981 | Rizzello | 369/263 X |
| 4,389,718 | 6/1983 | Rizzello | 369/263 X |
| 4,764,917 | 8/1988 | Sugihara et al. | 369/75.1 X |
| 4,922,478 | 5/1990 | Verhagen | 369/263 X |
| 4,979,161 | 12/1990 | Verhagen | 369/75.1 X |

FOREIGN PATENT DOCUMENTS

| | | |
|---|---|---|
| 1109914 | 6/1961 | Fed. Rep. of Germany . |
| 62-63853 | 4/1987 | Japan . |
| 1002827 | 9/1965 | United Kingdom . |

Primary Examiner—Benjamin R. Fuller
Assistant Examiner—Randy W. Gibson
Attorney, Agent, or Firm—Townsend and Townsend

[57] ABSTRACT

Deck bases of conventional disk memory reproduction devices are fastened at four points by side lock pins protruding from the front and rear of the deck base and the side lock plates located opposite the side lock pins. This invention reduces the parts count and makes the deck base more compact by fixing the deck base at three points using side lock pins and side lock plates placed opposite them.

13 Claims, 2 Drawing Sheets

DECK BASE LOCKING DEVICE FOR RECORDING PLAYBACK UNIT

BACKGROUND OF THE INVENTION

This invention relates to a deck base locking device for a disk recording playback unit which uses dampers to suspend a deck base which is coupled to a turntable.

A conventional deck base locking device for a compact disk player includes a rotating turntable upon which a disk is mounted; a deck base which supports the free rotation of a clamp arm, coupled to and moving in tandem with the turntable, which has a clamp mounted at the end of the clamp arm that sandwiches the disk between itself and the turntable; dampers mounted on the deck base which support the deck base so that it floats with respect to the base; side lock pins projecting from the front and rear of the deck base; and side lock plates mounted opposite the side lock pins which lock the side lock pins when a disk is mounted on the turntable. See Japanese Patent Kokai No. 62-63853.

In conventional compact disk players such as described above, the optical pick-up and the disk drive motor are integrated with the deck base and supported so that the entire unit floats with respect to the base. This prevents external vibrations, noise etc. from disturbing the optical pick-up while it reads information encoded on the disk. Thus, while the disk is mounted on the turntable, locking the deck base ensures the disk moves smoothly together with the turntable, locking the side lock pins in the side lock plates locks the deck base.

In the compact disk deck base locking device configured as described above, side lock pins protrude from the front and the rear of the deck base. The side lock pins act together with the side lock plate opposite them. Thus the deck base is supported at four points; as the number of locking members or parts to fix the deck base increases, growing structural complexity creates problems.

SUMMARY OF THE INVENTION

Accordingly, it is an object of this invention to provide a deck base locking device which uses fewer locking members, costs less and is more compact than conventional deck base fixing devices.

Another object of this invention is to provide a structurally simple device which locks the deck base stably.

According to this invention, while a disk is mounted on the turntable, the deck base is locked in three places by the lock plate and the locking device.

Other objects and aspects of the invention will become apparent from the following description of embodiments with reference to the accompanying drawings.

DESCRIPTION OF THE PREFERRED EMBODIMENT

Figure 1:
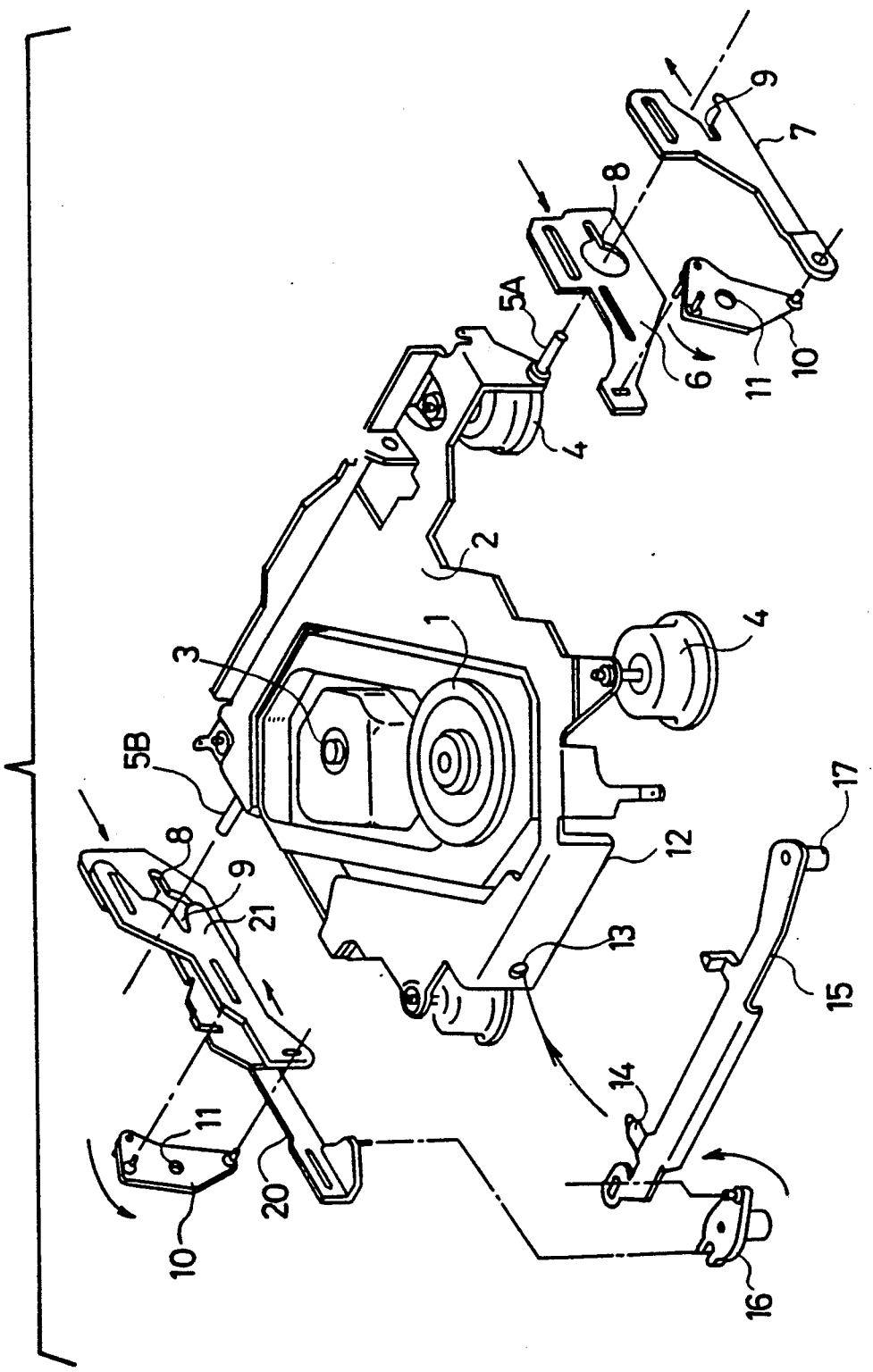
FIG. 1 is an exploded perspective view of a deck base locking device according to an embodiment of this invention.

In FIG. 1, a turntable 1, upon which a disk (not shown) is mounted, is coupled to a deck base 2. The deck base 2 pivotably supports a clamp arm (not shown) which has a clamp (not shown) mounted on its end that sandwiches the disk between itself and the turntable 1. A optical pick-up 3 which reads information encoded on the disk and a disk drive motor (not shown) are mounted on the deck base 2. A damper 4 is mounted on each of the four corners of the deck base 2 so that the deck base 2 floats with respect to the base (not shown) in order to prevent disturbances from external vibrations, noise etc. while the optical pick-up 3 reads information encoded on the disk.

Side lock pins 5A and 5B protrude from opposite sides of the deck base 2. A first side lock plate 6 and a second side lock plate 7 are mounted on the side lock pin 5A. A lock groove 8 is made for slidable insertion of the side lock pin 5A in the first side lock plate 6. A notch groove 9 is made in the second lock plate 7. A side lock link 10 couples the first lock plate 6 with the second lock plate 7. The first lock plate 6 and the second lock plate 7 move in reciprocating motion in opposing directions due to the swinging motion of the side lock link 10 about a pivot hole 11.

A first side lock plate 20 and a second side lock plate 21 are mounted on the side lock pin 5B on the opposite side of the deck base 2. The lock groove 8 is formed for the slidable insertion of the side lock pin 5B in the first lock plate 20. The notch groove 9 is made in the second lock plate 21. A side lock link 10 couples the first lock plate 20 with the second lock plate 21. The first lock plate 20 and the second lock plate 21 are in reciprocating motion in opposing directions due to the swinging motion of the side lock link 10 about a pivot hole 11.

A bend 12 bent into a right angle from the front edge of the deck base 2 has a lock hole 13. A front lock plate 15 on the front of the bend 12 has a front lock pin 14 to be inserted in the lock hole 13. The front lock link 16 couples the front lock plate 15 to the first lock plate 20. Then the swinging motion of the front lock link 16 moves the front lock plate 15 in swinging motion about the pivot 17, inserting the front lock pin 14 in the lock hole 13 and removing it therefrom periodically.

Figure 2:
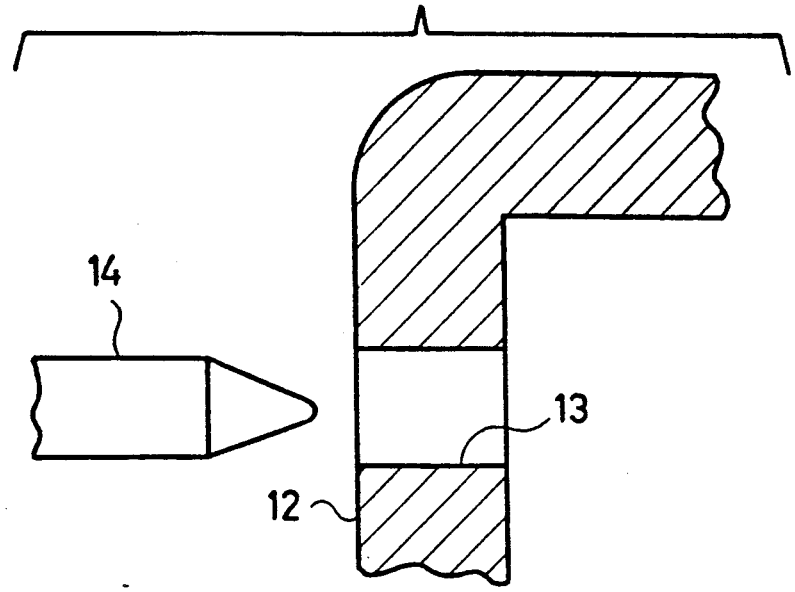
FIG. 2 is an enlarged sectional view of the essential elements of FIG. 1.

FIG. 2 shows, in an enlarged cutaway view, the lock device having the lock hole 13 and the front lock pin 14 which has a tapered end. The front lock pin 14 is shown just before insertion in the lock hole 13.

In the deck base locking device of the compact disk player configured as described above, when a disk on a tray (not shown) is mounted on the turntable 1, the side lock link 10 rotates counterclockwise about the pivot hole 11 in the direction of the arrow. The first lock plates 6 and 20 and the second lock plates 7 and 21 move closer to each other, respectively. The side lock pins 5A and 5B are sandwiched between the lock groove 8 and the notch groove 9.

The rotary motion of the side lock link 10 couples the motion of a first lock plate 20 to produce counterclockwise rotary motion in the front lock link 16. The front lock plate 15, rotating clockwise about the pivot 17, inserts the front lock pin 14 in the lock hole 13. Thus, while a disk is mounted on the turntable 1, the side lock pins 5A and 5B are sandwiched between the lock groove 8 and the notch groove 9. The insertion of the front lock pin 14 in the lock hole 13 locks the deck base 3 at three points. Thus, the deck base 2 is fixed while the disk is mounted on the turntable 1.

The deck base 2 is freed by rotating the side lock link 10 in the clockwise direction to move the first lock plates 6 and 20, the second lock plates 7 and 21, and the front lock plate 15 in the direction opposite from the directions in which they moved in order to lock the deck base 2. Thus, the deck base is supported so that it floats relative to the base while the optical pick-up 3 reads information encoded on the disk.

Figure 3:
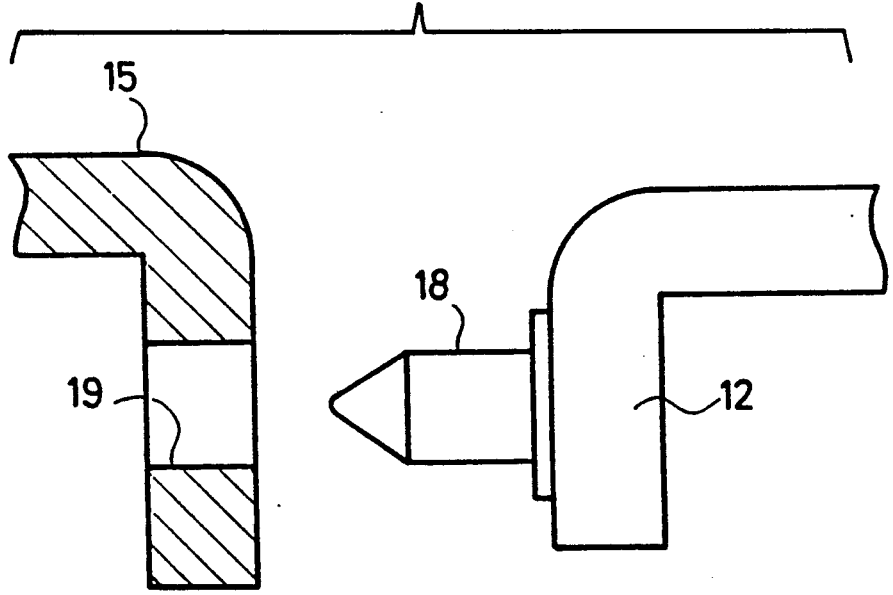
FIG. 3 is an enlarged sectional view of the essential elements of another embodiment of this invention.

FIG. 3 shows another embodiment of the locking device. This locking device includes a front lock pin 18 mounted on the bend 12 and a lock hole 19 in the front lock plate 15.

Although the embodiment described above for a deck base locking device for a disk recording playback unit takes a compact disk player as an example, this invention is not limited to the deck base locking devices of compact disk players. This invention can also find applications as a deck base locking device in magnetic disk players.

As explained above, according to the deck base locking device for the disk recording playback unit of this invention, the lock plate and the locking device lock the deck base at three points compared with the four points of conventional devices when a disk is mounted on the turntable. This decreases the number of locking members for locking the deck base and simplifies the design of the mechanism.

What is claimed is:

1. A deck base locking device for a disk-type recording playback unit having a base, comprising:
   a turntable for mounting a disk;
   a deck base coupled to said turntable and pivotably supporting a clamp arm having a clamp mounted at an end thereof which sandwiches a disk between said clamp and said turntable;
   dampers mounted on said deck base and for supporting said deck base on said recording unit base so that said deck base floats with respect to said recording unit base;
   side lock pins projecting from opposite sides of said deck base;
   lock plates mounted on said side lock pins so as to lock said side lock pins when a disk is mounted on said turntable;
   a coupling member for coupling one of said lock plates to a front lock plate; and
   wherein said lock plates and said side lock pins are coupled together to lock said deck base at three points when a disk is mounted on said turntable.

2. The deck base locking device of claim 1, wherein said locking device further comprises:
   a locking hole made in a front bend of said deck base; and
   a front lock plate with a front lock pin provided so that when a disk is mounted on said turntable, said front lock pin is inserted in said lock hole to lock said deck base.

3. The deck base locking device of claim 1, wherein said locking device further comprises:
   a front lock pin made on a front bend of said deck base; and
   a front lock plate with a locking hole provided so that when a disk is mounted on said turntable, said front lock pin is inserted in said lock hole to lock said deck base.

4. The deck base locking device of claim 2, wherein said front bend is bent at approximately a right angle from said deck base.

5. The deck base locking device of claim 3, wherein said front bend is bent at approximately a right angle.

6. The deck base locking device of claim 2, wherein said front lock plate is coupled to one of said side lock plates through a front lock link so that rotary motion of said front lock link produces rotary motion in said front lock plate about a pivot of the front lock plate, thus inserting said front lock pin in said locking hole or withdrawing it therefrom.

7. The deck base locking device of claim 3, wherein said front lock plate is coupled to one of said side lock plates through a front lock link so that rotary motion of said front lock link produces rotary motion in said front lock plate about a pivot of the front lock plate, thus inserting said front lock pin in said locking hole or withdrawing it therefrom.

8. A deck base locking device for a recording playback unit including a base, a deck base, dampers for supporting said deck base on said base so that said deck base floats with respect to said base, a turntable rotatably mounted on said deck base, and a clamp pivotably mounted on said deck base to sandwich a disk between the clamp and said turntable, which comprises:
   side lock pins projecting from opposite sides of said deck base;
   side lock plates mounted on said side lock pins so as to lock said side lock pins when a disk is mounted on said turntable;
   a locking device provided in front of said deck base for locking said deck base, whereby said side lock plates and said locking device lock said deck base at three points while a disk is mounted on said turntable; and
   said locking device comprising a locking hole made in front bend of said deck base and a front lock plate with a front lock pin provided so that when a disk is mounted on said turntable, said front lock pin is inserted in said lock hole to lock said deck base.

9. A deck base locking device for a recording playback unit including a base, a deck base, dampers for supporting said deck base on said base so that said deck base floats with respect to said base, a turntable rotatably mounted on said deck base, and a clamp pivotably mounted on said deck base to sandwich a disk between the clamp and said turntable, which comprises:
   side lock pins projecting from opposite sides of said deck base;
   side lock plates mounted on said side lock pins so as to lock said side lock pins when a disk is mounted on said turntable;
   a locking device provided in front of said deck base for locking said deck base, whereby said side lock plates and said locking device lock said deck base at three points while a disk is mounted on said turntable; and
   said locking device comprising a front lock pin made on a front bend of said deck base and front lock plate with a locking hole provided so that when a disk is mounted on said turntable, said front lock pin is inserted in said lock hole to lock said deck base.

10. A deck base locking device for a recording playback unit including a base, a deck base, dampers for supporting said deck base on said base so that said deck base floats with respect to said base, a turntable rotatably mounted on said deck base, and a clamp pivotably mounted on said deck base to sandwich a disk between the clamp and said turntable, which comprises:

side lock pins projecting from opposite sides of said deck base;

side lock plates mounted on said side lock pins so as to lock said side lock pins when a disk is mounted on said turntable;

a locking device provided in front of said deck base for locking said deck base, whereby said side lock plates and said locking device lock said deck base at three points while a disk is mounted on said turntable;

said locking device comprising a locking hole made in a front bend of said deck base and a front lock plate with a front lock pin provided so that when a disk is mounted on said turntable, said front lock pin is inserted in said lock hole to lock said deck base; and said front bend being bent at approximately a right angle from said deck base.

11. A deck base locking device for a recording playback unit including a base, a deck base, dampers for supporting said deck base on said base so that said deck base floats with respect to said base, a turntable rotatably mounted on said deck base, and a clamp pivotably mounted on said deck base to sandwich a disk between the clamp and said turntable, which comprises:

side lock pins projecting from opposite sides of said deck base;

side lock plates mounted on said side lock pins so as to lock said side lock pins when a disk is mounted on said turntable;

a locking device provided in front of said deck base for locking said deck base, whereby said side lock plates and said locking device lock said deck base at three points while a disk is mounted on said turntable;

said locking device comprising a front lock pin made on a front bend of said deck base and front lock plate with a locking hole provided so that when a disk is mounted on said turntable, said front lock pin is inserted in said lock hole to lock said deck base; and said front bend being bent at approximately a right a right angle.

12. A deck base locking device for a recording playback unit including a base, a deck base, dampers for supporting said deck base on said base so that said deck base floats with respect to said base, a turntable rotatably mounted on said deck base, and a clamp pivotably mounted on said deck base to sandwich a disk between the clamp and said turntable, which comprises:

side lock pins projecting from opposite sides of said deck base;

side lock plates mounted on said side lock pins so as to lock said side lock pins when a disk is mounted on said turntable;

a locking device provided in front of said deck base for locking said deck base, whereby said side lock plates and said locking device lock said deck base at three points while a disk is mounted on said turntable;

said locking device comprising a locking hole made in a front bend of said deck base and a front lock plate with a front lock pin provided so that when a disk is mounted on said turntable, said front lock pin is inserted in said lock hole to lock said deck base; and said front lock plate being coupled to one of said side lock plates through a front lock link so that rotary motion of said front lock link produces rotary motion in said front lock plate about a pivot of the front lock plate, thus inserting said front lock pin in said locking hole or withdrawing it therefrom.

13. A deck base locking device for a recording playback unit including a base, a deck base, dampers for supporting said deck base on said base so that said deck base floats with respect to said base, a turntable rotatably mounted on said deck base, and a clamp pivotably mounted on said deck base to sandwich a disk between the clamp and said turntable, which comprises:

side lock pins projecting from opposite sides of said deck base;

side lock plates mounted on said side lock pins so as to lock said side lock pins when a disk is mounted on said turntable;

a locking device provided in front of said deck base for locking said deck base, whereby said side lock plates and said locking device lock said deck base at three points while a disk is mounted on said turntable;

said locking device comprising a front lock pin made on a front bend of said deck base and front lock plate with a locking hole provided so that when a disk is mounted on said turntable, said front lock pin is inserted in said lock hole to lock said deck base; and said front lock plate is coupled to one of said lock plates through a front lock link so that rotary motion of said front lock link produces rotary motion in said front lock plate about a pivot of the front lock plate, thus inserting said front lock in said locking hole or withdrawing it therefrom.

* * * * *